US 11,539,741 B2

United States Patent
Villeda et al.

(10) Patent No.: US 11,539,741 B2
(45) Date of Patent: Dec. 27, 2022

(54) SYSTEMS AND METHODS FOR PREVENTING, THROUGH MACHINE LEARNING AND ACCESS FILTERING, DISTRIBUTED DENIAL OF SERVICE ("DDOS") ATTACKS ORIGINATING FROM IOT DEVICES

(71) Applicant: Bank of America Corporation, Charlotte, NC (US)

(72) Inventors: Luis Fernando Villeda, New York, NY (US); Maria Carolina Barraza Enciso, New York, NY (US); Elena Kvochko, New York, NY (US)

(73) Assignee: Bank of America Corporation, Charlotte, NC (US)

( * ) Notice: Subject to any disclaimer, the term of this patent is extended or adjusted under 35 U.S.C. 154(b) by 299 days.

(21) Appl. No.: 16/561,523

(22) Filed: Sep. 5, 2019

(65) Prior Publication Data

US 2021/0075823 A1 Mar. 11, 2021

(51) Int. Cl.
*G06F 9/00* (2006.01)
*H04L 9/40* (2022.01)
(Continued)

(52) U.S. Cl.
CPC ......... *H04L 63/1458* (2013.01); *G06N 20/00* (2019.01); *H04L 63/0236* (2013.01);
(Continued)

(58) Field of Classification Search
CPC .............. H04L 47/125; H04L 47/2441; H04L 63/1425; H04L 41/145; H04L 63/0464;
(Continued)

(56) References Cited

U.S. PATENT DOCUMENTS 7,774,849 B2  8/2010 Russell et al.
8,255,996 B2  8/2012 Elrod et al.
(Continued)

OTHER PUBLICATIONS

Jim Duffy, "8 Internet Things That Are Not IoT: Cisco's Big Market Numbers May Not Include Smartphones, Tablets and PCs," https://www.networkworld.com/article/2378581/8-internet-things-that-are-not-iot.html, IDG Communications, Inc., Jun. 26, 2014.
(Continued)

*Primary Examiner* — Dustin Nguyen
(74) *Attorney, Agent, or Firm* — Weiss & Arons LLP (57) ABSTRACT

A method for filtering internet traffic is provided. The method may include using a private network for receiving a request message from an electronic device within the private network and identifying the type of the electronic device. When the electronic device is identified as a non-IoT type device, the method may include transmitting the request message through the non-IoT output channel and when the electronic device is identified as an IoT type device the method may include transmitting the request message through the IoT output channel. The method may further include using an IP address filter gateway for filtering incoming traffic to a web server, the filtering may include granting device access to the web server when the request message is received through the non-IoT output channel and denying access to the web server when the request message is received through the IoT output channel.

18 Claims, 5 Drawing Sheets

(51) Int. Cl.
  *H04L 67/12* (2022.01)
  *G06N 20/00* (2019.01)
  *H04L 101/622* (2022.01)
(52) U.S. Cl.
  CPC .......... *H04L 63/1416* (2013.01); *H04L 67/12* (2013.01); *H04L 2101/622* (2022.05)
(58) Field of Classification Search
  CPC ..... H04L 63/1441; H04L 67/01; H04L 67/10; H04L 67/12; G06N 5/003; G06N 7/005; H04W 28/18; H04W 36/22; H04W 47/125; H04W 28/26; G08C 17/02; G06K 9/6269
  See application file for complete search history.

(56) References Cited

U.S. PATENT DOCUMENTS

| | | | |
|---|---|---|---|
| 8,615,785 | B2 | 12/2013 | Elrod et al. |
| 9,055,006 | B2 | 6/2015 | Chesla et al. |
| 9,398,027 | B2 | 7/2016 | Li et al. |
| 9,882,912 | B2 | 1/2018 | Joo |
| 10,002,526 | B1* | 6/2018 | Dyer ................. G08C 17/02 |
| 10,091,100 | B1* | 10/2018 | Duerk ................. H04L 47/125 |
| 10,171,492 | B2 | 1/2019 | Kish et al. |
| 10,326,796 | B1* | 6/2019 | Varadarajan ........ H04L 63/1425 |
| 11,115,823 | B1* | 9/2021 | Heiland ............. H04L 63/1425 |
| 2012/0124666 | A1 | 5/2012 | Kim et al. |
| 2016/0380900 | A1* | 12/2016 | Kolhi ................. H04L 47/2441 370/235 |
| 2017/0195351 | A1 | 7/2017 | Turnbull |
| 2017/0201585 | A1* | 7/2017 | Doraiswamy ........... H04L 67/10 |
| 2018/0054490 | A1 | 2/2018 | Wadhwa et al. |
| 2018/0063079 | A1* | 3/2018 | Ding ................. H04L 63/0464 |
| 2018/0159894 | A1 | 6/2018 | Reddy et al. |
| 2018/0191674 | A1 | 7/2018 | Whittle et al. |
| 2018/0191729 | A1* | 7/2018 | Whittle .................. H04L 67/01 |
| 2018/0249382 | A1* | 8/2018 | Yang ..................... H04W 36/22 |
| 2018/0270820 | A1* | 9/2018 | Gupta .................. H04W 28/16 |
| 2018/0295101 | A1* | 10/2018 | Gehrmann .......... H04L 63/1441 |
| 2018/0375887 | A1 | 12/2018 | Dezent et al. |
| 2019/0068626 | A1 | 2/2019 | Compton |
| 2019/0081961 | A1 | 3/2019 | Bansal |
| 2019/0166144 | A1* | 5/2019 | Mirsky ................. G06N 7/005 |
| 2020/0211721 | A1* | 7/2020 | Ochoa .................. H04L 41/145 |
| 2020/0288353 | A1* | 9/2020 | Kulkarni ............... H04W 28/26 |
| 2020/0304455 | A1* | 9/2020 | Karkhanis ............... H04L 67/12 |
| 2021/0360406 | A1* | 11/2021 | Heiland ............... G06K 9/6269 |
| 2022/0086071 | A1* | 3/2022 | Sivaraman .......... H04L 63/1425 |

OTHER PUBLICATIONS

"The Internet of Things Ecosystem is Broken. How Do We Fix It?" https://blog.trendmicro.com/trendlabs-security-intelligence/internet-things-ecosystem-broken-fix/, Trend Micro Incorporated, Oct. 26, 2016.
Noah Apthorpe et al., "A Smart Home Is No Castle: Privacy Vulnerabilities of Encrypted IoT Traffic," https://arxiv.org/pdf/1705.06805.pdf, May 18, 2017.
Arunan Sivanathan et al., "Characterizing and Classifying IoT Traffic in Smart Cities and Campuses," https://ieeexplore.ieee.org/document/8116438, May 2017.
"IOT Security: Why Your Toaster Needs a Firewall," https://skelia.com/articles/iot-security-why-your-toaster-peeds-a-firewall/, Skelia Sarl, Feb. 9, 2018.
"How Do Computers Connect Over the Internet?" https://www.computerhope.com/issues/ch001358.htm, Jan. 31, 2019.
Brian Yoder, "What Info Can You Get From Mac Address?" https://www.quora.com/What-info-can-you-get-from-mac-address, Quora, Jun. 15, 2019.
"MAC Address," https://techterms.com/definition/macaddress, Retrieved on Jul. 15, 2019.
"What Is A Mac Address?" https://whatismyipaddress.com/mac-address, What Is My IP Address, Retrieved on Jul. 15, 2019.
"Princeton IoT Inspector: Our Smart Devices Are Watching Us," https://iot-inspector.princeton.edu, Retrieved on Jul. 22, 2019.
"Transmission Control Protocol," https://en.wikipedia.org/wiki/Transmission_Control_Protocol, Wikimedia Foundation, Inc., Jul. 24, 2019.

* cited by examiner

SYSTEMS AND METHODS FOR PREVENTING, THROUGH MACHINE LEARNING AND ACCESS FILTERING, DISTRIBUTED DENIAL OF SERVICE ("DDOS") ATTACKS ORIGINATING FROM IOT DEVICES

FIELD OF TECHNOLOGY

Aspects of the disclosure relate to mitigating Distributed Denial of Service ("DDoS") Attacks on the internet. Specifically, aspects of the disclosure relate to preventing and mitigating DDoS attacks originating from Internet of Things ("IoT") devices.

BACKGROUND OF THE DISCLOSURE

A typical private network i.e.—a private network not available to public access, may include numerous IoT devices. The network itself may include IoT devices including but not limited to, kitchen appliances, audio systems, smart thermostats, outlets, baby monitoring devices, locks and other suitable smart devices.

Private networks can be managed by an authorized individual. The authorized individual may have the technical capabilities to add the IoT devices to the network. However, such an authorized individual may be unable to properly secure the private network. Specifically, many IoT devices may be insecure. The security faults of IoT devices may include unchanged default credentials, the lack of appropriate firewalls, easily surmountable default security settings, little or no transmission encryption and failure to receive timely critical updates.

Furthermore, to date, there are minimal regulations and consumer protections on the security of IoT devices. This may be an issue because of third parties associated with supplier chains.

Additionally, because of the ubiquitous nature of the IoT devices, such IoT devices can provide unauthorized access to, or be leveraged to provide unauthorized access to, personal sensitive information or physical locations connected to the private network.

IoT devices are a convenience to those connected to private home networks. IoT devices can perform various time saving functionalities such as automating previously manual tasks. Therefore, notwithstanding the security issues, IoT devices have proliferated in recent years.

Because of the security concerns associated with IoT devices, and because of the proliferation of these IoT devices, attackers may leverage these security vulnerabilities to perform malicious attacks. Additionally, 5G networks, which provide higher speeds of communication, can enable these IoT devices to operate at higher speeds and therefore operate maliciously at higher speeds.

One of the possible attacks performed using IoT devices is a Distributed Denial of Service ("DDoS") attack. DDoS attacks may be attacks where a malicious actor gains control of multiple devices and utilizes the controlled devices in a malicious manner. One way the malicious actor utilizes control of the hijacked devices, may be to dispatch thousands of requests to a machine or resource in an attempt to overload the system and prevent legitimate requests from being fulfilled. Recently, DDoS attacks have been used to harm critical infrastructure.

Several measures exist that may mitigate the impact of these types of attacks such as firewalls, artificial intelligence ("AI"), dynamic resource allocation algorithms and additional safety protections. These measures may cause the attacks to be unsuccessful. The typical private network administrator may not have the technical knowledge to detect that one of the devices on the private network has been compromised and is being used as part of a botnet network.

Therefore, it would be desirable to provide a system that puts a layer of security around IoT communications to disable or prevent harmful IoT communications.

SUMMARY OF THE DISCLOSURE

Aspects of the disclosure relate to a private network architecture. The private network architecture may include one or more internet of things ("IoT") devices. The private network architecture may also include one or more non-IoT devices. Each of the IoT devices and non-IoT devices may support internet communication capabilities.

The private network architecture may also include a network router. The network router may include a network router device filter. The network router device filter may be configured to identify types of electronic devices transmitting request messages. The network router device filter may be enabled to differentiate a request message received from an IoT type of device and a request message received from a non-IoT type of device.

When the network router receives a request message from an electronic device within the private network, the network router device filter may be configured to identify a type of electronic device transmitting the request message. The type of electronic device may be one of an IoT type device and a non-IoT type device. In some embodiments, the network router device filter may be enabled to determine a media access control ("MAC") address associated with the electronic device, and classify the type of electronic device based on the MAC address.

The identifying the type of electronic device may be further based on one or more unique identifiers ("UID"). The one or more UID's may include at least one of an operating system, screen size, internal ports and external ports associated with the electronic device.

When the electronic device is identified as the non-IoT type device, the network router may be configured to transmit a request message received from the device through the non-IoT output channel and when the electronic device is identified as the IoT type device, the network router may be configured to transmit the request message through the IoT output channel. Both channels being two different external IP addresses.

In some embodiments, the request message may be a first request message and the network router may be further configured to receive a plurality of request messages from a plurality of electronic devices. In this embodiment, the network router device filter may be configured to, prior to transmitting each request message to the web server, filter each request message. The filtering may include for each request message transmitting the request message through the non-IoT output channel when the electronic device transmitting the request message is identified as the non-IoT type device. The filtering may include transmitting the request message through the IoT output channel when the electronic device transmitting the request message is identified as the IoT type device.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Systems and method are provided for internet traffic filtering. The system may classify electronic devices as being one of Internet of Things ("IoT") devices and non-IoT devices. The classifying may be for segregating IoT devices from non-IoT devices. The segregating may be for the prevention and/or mitigation of distributed denial of services ("DDoS") attacks.

Electronic devices, for the purpose of the disclosure, may include both IoT devices and non-IoT devices. Both IoT and non-IoT devices have capabilities embedded within the devices to enable a connection to the internet. The amount of electronic devices and the different types of electronic devices that have internet capabilities are growing rapidly.

Since IoT types of devices are increasing at a very rapid speed, the security level and privacy level may not be at its maximum. Malicious actors may be taking advantage of the lower levels of security on IoT devices and may be using these types of devices to assist in attacking a web server and/or any online system.

There are many different types of malicious attacks that may be performed by malicious actors. One type of attack is known as a Distributed Denial of Service ("DDoS") attack. A DDoS attack may be an attack that attempts to overwhelm the web server or online system with data thereby slowing the server and/or online system to a level of 'crawling' or in many circumstances, completely crashing the server and/or online system.

There may be several types of DDoS attacks. The DDoS attacks may include application layer DDoS attacks, protocol layer DDoS attacks and volumetric DDoS attacks.

Many DDoS attacks include botnets to facilitate and increase the effectiveness of the attack. A botnet is a large group of computers to which an attacker gains access. The attacker may install Command and Control (C2) software on these computers and IOT devices in order to create the botnet. Once a botnet is created, the attacker(s) may send a start command to all the computers in the botnet. The botnet may then send their requests to a victim's server which floods the server. Flooding the victim's server with all these requests may cause the victim's server to crash. This may, in essence, cause a loss in productivity and service interruption. The service interruption may cause a loss in customer's accessing a website for purchases causing a huge loss of money to the victim.

Attackers are taking advantage of the fact that many internet connected devices (i.e.—IoT devices) are not very secure and are using these types of devices to create a botnet. An average consumer that owns IoT devices may not be an expert on securing their devices and may not even be aware that there are security concerns stemming from their IoT devices or private network.

There are many web services and online systems that typically do not receive, or expect to be receiving, requests from IoT types of devices. For example, an online banking application may not typically receive requests from an IoT device. Therefore, by discerning types of devices that may be transmitting internet requests before the request gets processed, may enable a greater chance of minimizing, and thereby mitigating, DDoS attacks coming from IoT devices.

The internet traffic filtering system, in accordance with embodiments of the invention, may include a private network. The private network may be a home network. The private network may be a businesses' network. Each network may include one or more electronic devices. The electronic devices may include IoT devices and/or non-IoT devices. To enable internet connection on any device within a network, the device may require having a Network Interface Card ("NIC") installed on the computer. The NIC may be installed by the manufacturer of the device.

In response to the receipt of a request message, the private network may be configured to identify the type of the electronic device. The private network may identify the type of electronic device as an IoT type of device. The private network may identify the type of device as a non-IoT type of device.

The identification of the type of device may be based, at least in part, on the media access control ("MAC") address of the device. A MAC address is a hardware identification number that uniquely identifies every device. The MAC address may be given to a network adapter when it is manufactured. It may be hard-coded, hardwired or printed into each NIC.

The MAC address may also be referred to as a networking hardware address, a burned-in address ("BIA") and a physical address. Since there may be millions of networkable devices that exist, there has to be a unique MAC address for each device. Therefore MAC addresses are made of six two-digit hexadecimal numbers that may be separated by colons.

There are many manufacturers of network adapters and/or NIC's. Each manufacturer may include a specific number sequence known as the Organizationally Unique Identifier ("OUI") within the MAC address. Therefore a portion of the MAC address may be indicative of the manufacturer of the device. For example, the first three octets of the MAC address may be indicative of the manufacturer. Some well-known manufacturers may include Nortel®—00-04-DC, Cisco®—00-40-96 and Belkin®—00-30-BD. The sequence that identifies the manufacturer may be at the beginning of the address.

System networks may easily identify the MAC address and therefore a user may not need to know the number. By identifying the manufacturer of the device, via the OUI, the system may be enabled to further identify the actual type of device that was manufactured. This further identification may be enabled via a library within each device manufacturer. The manufacturer may have a defined list of each device that they manufactured and the corresponding MAC address.

The system may further user other unique identifiers ("UID") to better classify the type of device. The UID's may include at least one of an operating system, screen size, internal ports and external ports associated with the electronic device.

In some embodiments, when a device creates and sends a request message, the system may capture the header and may obtain the device's MAC address. The header may also include information about the browser, the operating system, system ports. The system may identify the device based on the information within the header.

Based on the MAC address and further based on the other UID's, the system may be configured to capture all the data and store it as a combination for machine learning data. This machine learning data may assist in a more accurate identification of impending classification of devices. The machine learning data may be stored locally in the private network.

The system may then be configured to, when one or more subsequent request message may be received, identify the MAC address and then perform a scan to determine whether the device previously submitted request(s). The private network may be configured to scan the machine learning data for a corresponding MAC address. When a match is found, the system may be enabled to identify the exact type of device.

In some embodiments, the private network may not find a match. However, the private network may find a MAC address with the same OUI. Through machine learning, the system may be configured to identify the device. The system may be configured to identify the $2^{nd}$ three bytes of the MAC address to further assist in determining the type of device. The $2^{nd}$ three bytes of the MAC address may be assigned by the manufacturer as the devices are produced. For example, the $2^{nd}$ three bytes of a refrigerator's MAC address from a specific manufacturer may be 12:87:11. Each refrigerator's MAC address that may be subsequently produced may go up by one digit. The second refrigerator may be assigned 12:87:12. The third refrigerator may be assigned a MAC address of 12:87:13. Therefore, when a request message is received with a MAC address that ends in a similar range of numbers as a previously stored MAC address, the system may be configured to identify the type of device.

The system may be configured to repetitively use and adjust the machine learning data thereby enabling improvement of accuracy of the classification of the type of device.

The private network may include a network router. The network router may transmit request messages to the internet. The network router may include two output channels. One output channel may be an IoT output channel. The network router may transmit request messages via the IoT output channel when the request message is received from IoT type devices. The other output channel may be the non-IoT output channel. The network router may be configured to transmit request messages via the non-IoT output channel when the device transmitting the request is identified as a non-IoT type device.

Prior to the request message being received at a web server, the system may include an IP address filter gateway. The gateway may be configured to filter incoming traffic to the web server. The filtering may include granting device access to the web server when the request message is received through the non-IoT output channel. The filtering may include denying access to the web server when the request message is received through the IoT output channel.

In some embodiments, an Internet Service Provider ("ISP") may be configured to receive the request message and/or request messages from the IoT output channel or the non-IoT output channel.

Each electronic device may be in communication with a respective Internet Service Provider ("ISP"). The communication may be for enabling device connection to the internet. Each respective ISP may be able to assign two public IP addresses based, at least in part, on a type of the electronic device. The ISP may be configured to assign a non-IoT external IP address when the request message is received via the non-IOT output channel. The ISP may be configured to assign an IoT external IP address when the request message is received from the IoT output channel.

In some embodiments, the network router may also assign a pre-defined identifier to the request message. The pre-defined identifier may be based on a standardized device identification protocol. The standardized device identification protocol ("SDIP") may be a protocol that includes ranges of numeric values that may correspond to each type of device. The SDIP may include a range of numeric values for each category within each type of device.

The SDIP may include sub-categories that may fall within IoT types of devices and non-IoT type devices. For example, there may be a range of numeric values within IoT type devices for appliances, medical supplies, audio systems and home gadgets. The range of numeric values for appliances may be 100-199. The range of numeric values for medical supplies may be 200-299. The range of numeric values for audio systems may be 300-399. The range of numeric values for home gadgets may be 400-499. The private network may be configured to scan the SDIP for the range of numeric values that correspond to the type of device sending the request message. The pre-defined identifier may be a variable portion of an IP address for the electronic device. In this embodiment, the pre-defined identifier assigned to the request message may be a more specific number defining the sub-category of the type of IoT and/or non-IoT type of device.

In some embodiments, the ISP may assign a unique IoT external IP address for each sub-category within IoT type devices. The gateway may be configured to further identify the sub-category of the device based on the unique IoT external IP address. The gateway may be configured to narrow acceptance and/or denial of entry to the web server further based on the sub-category of the device transmitting the request. The web server may allow entry of requests from specific types of IoT devices.

In some embodiments, the system may be configured to use payload data included in the request to further identify the type of device. The system may also be configured to identify types of devices via the way the devices communicate. For example, cellphones may transmit data synchronously, using real-time transport protocol. In contrast, IoT devices may communicate asynchronously.

In another embodiment, a method for filtering internet traffic is provided. The method may be for classifying electronic devices as IoT devices and non-IoT devices. The classifying may be for segregating IoT devices from non-IoT devices for the prevention of distributed denial of services ("DDoS") attacks.

The method may include using a private network for receiving a request message from an electronic device within the private network. The method may also include identifying the type of the electronic device.

It should be appreciated that the private network may be configured for receiving one request message from one device within the private network. The private network may be configured for receiving a plurality of request messages from a plurality of devices within the private network. The messages may be received one at a time. The messages may be received simultaneously.

When the electronic device is identified as a non-IoT type device, the method may include transmitting the request message through a non-IoT output channel. When the electronic device is identified as an IoT type device, the method may include transmitting the request message through an IoT output channel.

The method may also include using an IP address filter gateway configured for filtering incoming traffic to a web server. The filtering may include granting device access to the web server when the request message is received through the non-IoT output channel. The filtering may include denying access to the web server when the request message is received through the IoT output channel.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

Figure 1:
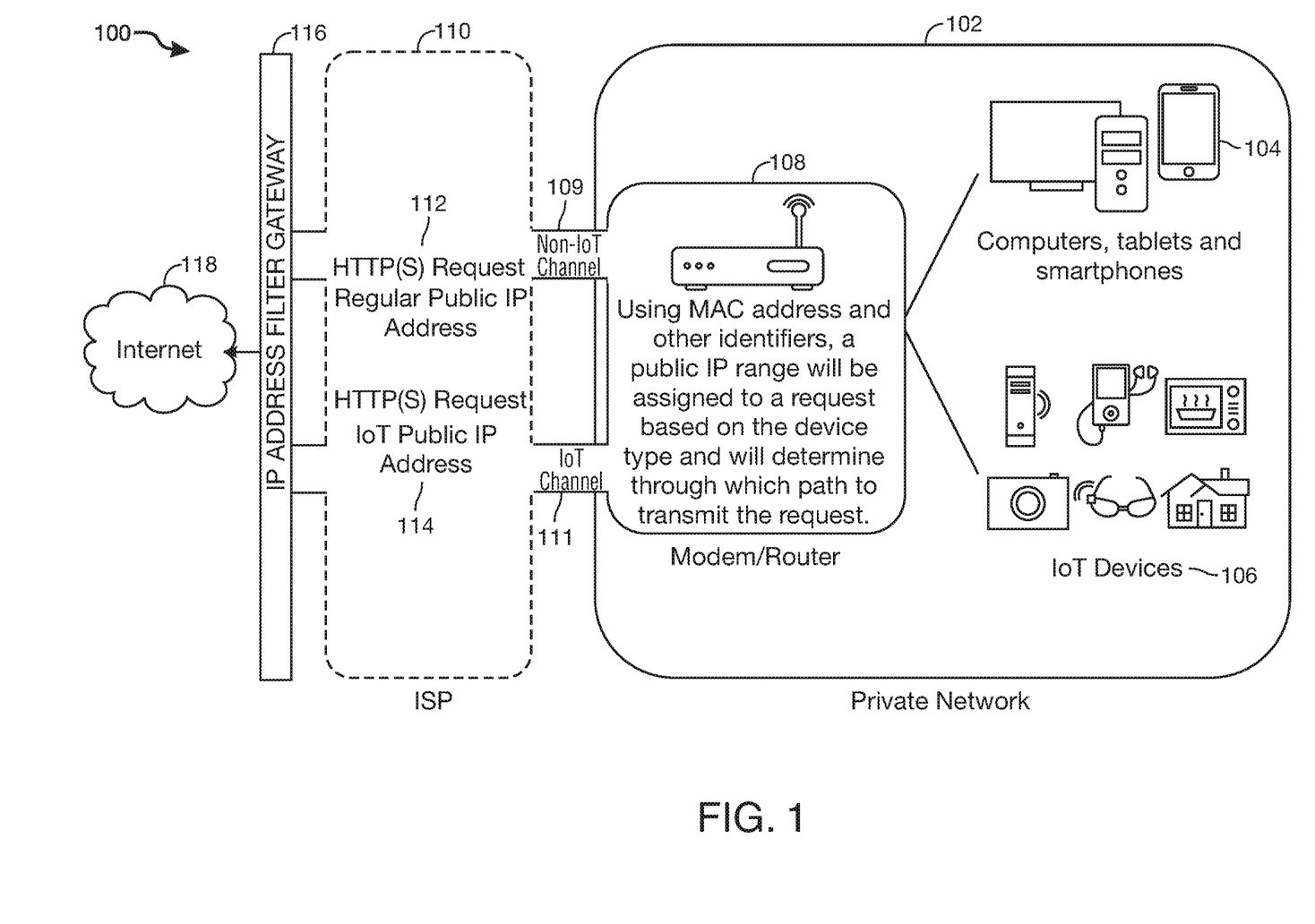
FIG. 1 shows illustrative system architecture in accordance with principles of the invention.

FIG. 1 shows a diagram of an internet traffic filtering system 100. The internet traffic filtering system 100 may include a home network 102. The home network 102 may include a plurality of electronic devices. The electronic devices may include non-IoT devices 104. The electronic devices may also include IoT devices 106.

The home network 102 may also include a modem and router 108. Each of the electronic devices 102 and 104 may be in connection with the modem and router 108. Router 108 may be in communication with an Internet Service Provider ("ISP") to enable the home network to connect to the internet.

The electronic devices, modem/router and ISP's all may use the TCP/IP as the protocol for communicating with the internet. The ISP may further transmit the request to the internet 118 to enable end to end communication between the home network 102 and the internet 118. The home network system may include a plurality of electronic devices transmitting traffic to the internet.

Each electronic device may transmit a request message. The request message may travel via the modem and router 108. The modem/router 108 may include a filter that may be configured to determine the type of device transmitting the request message. The filter may identify the MAC address associated with the device and may be able to determine the type of device transmitting the request message. The filter may further identify one or more other UID's to more accurately classify the device.

Upon identification of the type of device the router 108 may then transmit the request message to a web server/internet 118 via one of two paths. When a request message is received from an IoT type device, the message may be transmitted via an IoT channel 111. When the request message is received from a non-IoT type device, the message may be transmitted via the non-IoT channel 109.

In some embodiments, after each request message is transmitted via one of the two channels 109 and 111, the request message may be transmitted to the ISP 110 to receive an external IP address to connect to the internet 118. The ISP may be configured to assign a unique external IP address based on the channel from which the request is received. When the request message is received via the IoT channel 111, the ISP 110 may be configured to assign an IoT external IP address, as shown at 114. When the request message is received via the non-IoT channel 109, the ISP 110 may be configured to assign a non-IoT external IP address, as shown at 112.

The ISP may communicate with a domain name system ("DNS") to receive an IP address for the location on the internet 118 where the request may be transmitted. The location may be included in the request as a URL. The DNS may translate the URL into an IP address. The location may be a web browser, web server and/or any online system.

The web server, and/or the location on the internet 118 that may be receiving the request, may include an IP address filter gateway 116 that may be configured to filter each incoming request. The gateway 116 may be configured to deny entry of any request that may include an IoT external IP address 114. The gateway may be configured to allow entry of the request when the request includes a non-IoT external IP address 112.

Figure 2:
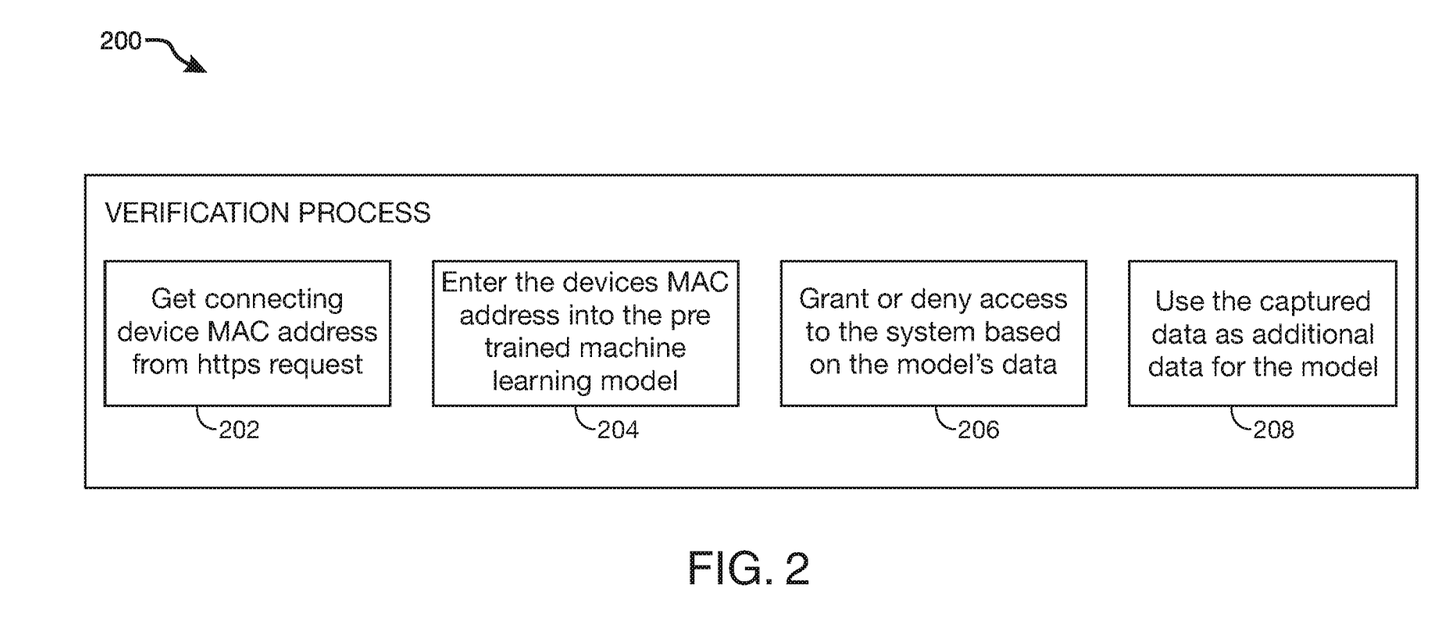
FIG. 2 shows an illustrative flowchart in accordance with principles of the invention.

FIG. 2 shows a verification process 200 in accordance with embodiments of the invention. The process 200 may include retrieving the MAC address associated with the connecting device's sending the HTTP request, as shown at 202. The process 200 may further include entering the devices MAC address into a pre-trained machine learning model, as shown at 204. The pre-trained machine learning model may be configured to store each MAC address associated with each request as a record. The record may also include recording other captured data i.e.—the browser, operating system and/or ports, which may be defined along with the MAC address. These data points may assist in identifying the type of device sending the request. The MAC address may then be labeled as 'non-IoT' or 'IoT.'

The verification process 200 may further include granting or denying access to an internet based system based on the label associated with the MAC address, as recorded in the machine learning model, as shown at 206. The process 200 may further include using the captured data as additional data for subsequent requests, as shown at 208.

Figure 3:
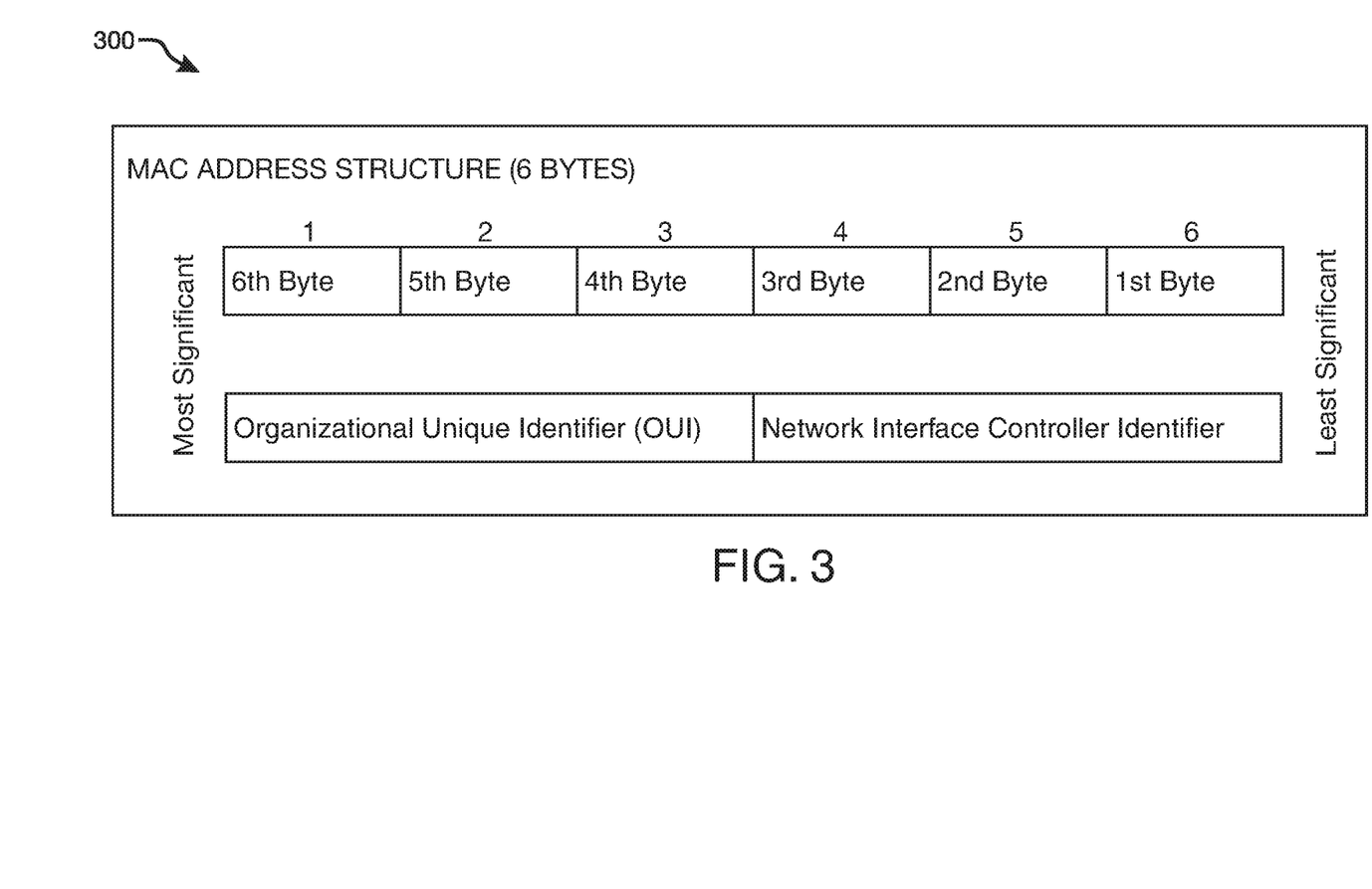
FIG. 3 shows an exemplary diagram in accordance with principles of the invention.

FIG. 3 shows an illustrative diagram 300 of the structure of a MAC address in accordance with principles of the invention. The MAC address may include 6 bytes. The first three bytes may be the most significant numbers. They are referred to as the organizational unique identifier ("OUI"), which may indicate the manufacturer of the device where the MAC address may be embedded to. The second three bytes may be less significant. The second three bytes may indicate the network interface controller identifier. The MAC address may include six two-digit hexadecimal numbers. Each two-digit hexadecimal number may represent one byte of the MAC address.

Figure 4:
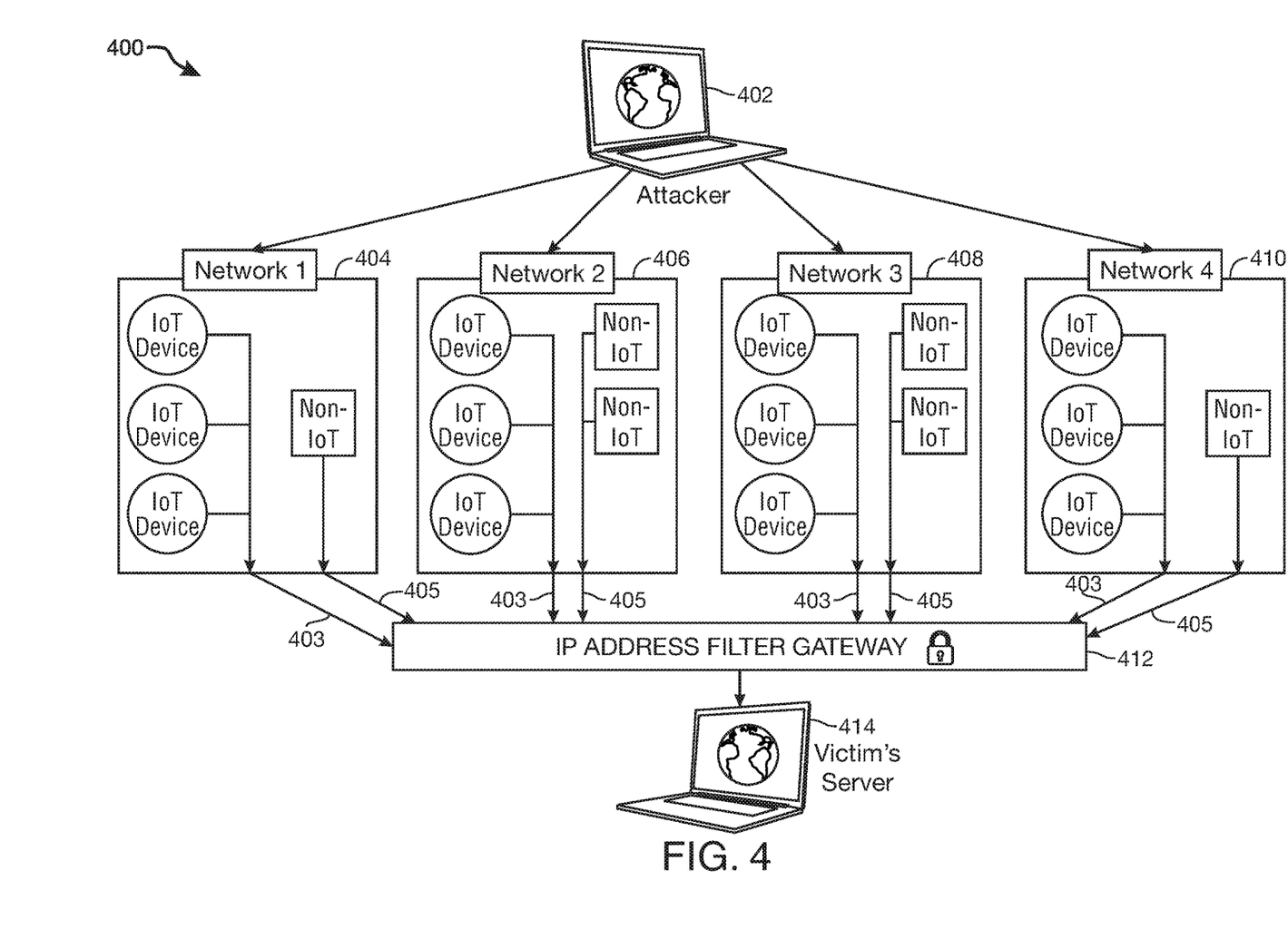
FIG. 4 shows an exemplary diagram in accordance with principles of the invention.

FIG. 4 shows an exemplary diagram 400 of an attempted DDoS attack on a web server. An attacker 402 may attempt to hack a victim's web server 414. The attacker 402 may search for internet connected devices that may have low security. The most common devices with low security may be IoT devices. The number of IoT devices is also growing rapidly and enables a large volume of devices to be overtaken by the attacker 402.

The attacker 402 may use malware to install command and control ("C2") software on each of the IoT devices to create a botnet. Attacker 402 may gain control over IoT devices within many different, private, networks. The private networks may be in the same location. The private networks may be in numerous locations all over the world.

Each of the messages from IoT devices may be transmitted along a first pathway 403, identified by a first IP address, to IP address filter gateway 412. Each of the messages from non-IOT devices may be transmitted along a second pathway 405, identified by a second IP address, to IP address filter gateway 412.

Network 1, as shown at 404, may include a plurality of IoT devices, non-IoT devices and two output pathways. Network 2, as shown at 406, may also include a plurality of IoT devices, non-IoT devices and two output pathways. Network 3, as shown at 408, may also include a plurality of IoT devices, non-IoT devices and two output pathways. Network 4, as shown at 410, may also include a plurality of IoT devices, non-IoT devices and two output pathways. Each IoT device within each network that may have had an attacker 402 intruding the device, may be referred to as a 'bot.'

In some embodiments, each non-IoT device may have also had an attacker intrude the device and may be included in the botnet. In other embodiments, the non-IoT devices may not have been intruded on by an attacker and thus not included in the botnet.

Each of IoT devices shown in networks 404, 406, 408 and 410 may represent many IoT devices. They each may represent hundreds of IoT devices. A DDoS attack may involve thousands of IoT devices attacking a victim.

Attacker 402, in this exemplary diagram, may be attempting to perform a DDoS attack. The DDoS attack may be an application layer DDoS attack. The DDoS attack may be a protocol layer attack.

In an application layer DDoS attack, the attacker 402 may load each bot with a complicated request from the victim's server 414. The requests may overload the target server as it may attempt to respond. The request may entail access to a database. The request may entail a large volume of downloads. When the victim's server 414 receives thousands or millions of these requests in a short period of time, operation of server 414 may slow to a crawl and/or shut down entirely.

In some embodiments, the application layer DDoS attack may be an HTTP flood attack. In an HTTP flood attack, each of the IoT devices within each of networks 404, 406, 408 and 410 may transmit fast HTTP requests in order to attack and shut down the victim's server 414.

In accordance with principles of the invention, the IP address filter gateway 412 may be enabled to stop the incoming requests from the IoT devices before the requests may flood the victim's network 414. Each IoT device may have been assigned, via an ISP, an IoT external IP address.

Each request may be forced to pass through the gateway 412 prior to being received by the victim's server. Gateway 412 may block entry a selected group of incoming requestS. Gateway 412 may be enabled to quickly identify, based on the external IP address, if the request is from an IoT device. The gateway 412 may identify the IP address as being associated with an IoT device and may deny entry to each of the requests. This denial may occur prior to the request attacking the victim's server 414 and may thereby mitigate and/or entirely prevent a DDoS attack.

Figure 5:
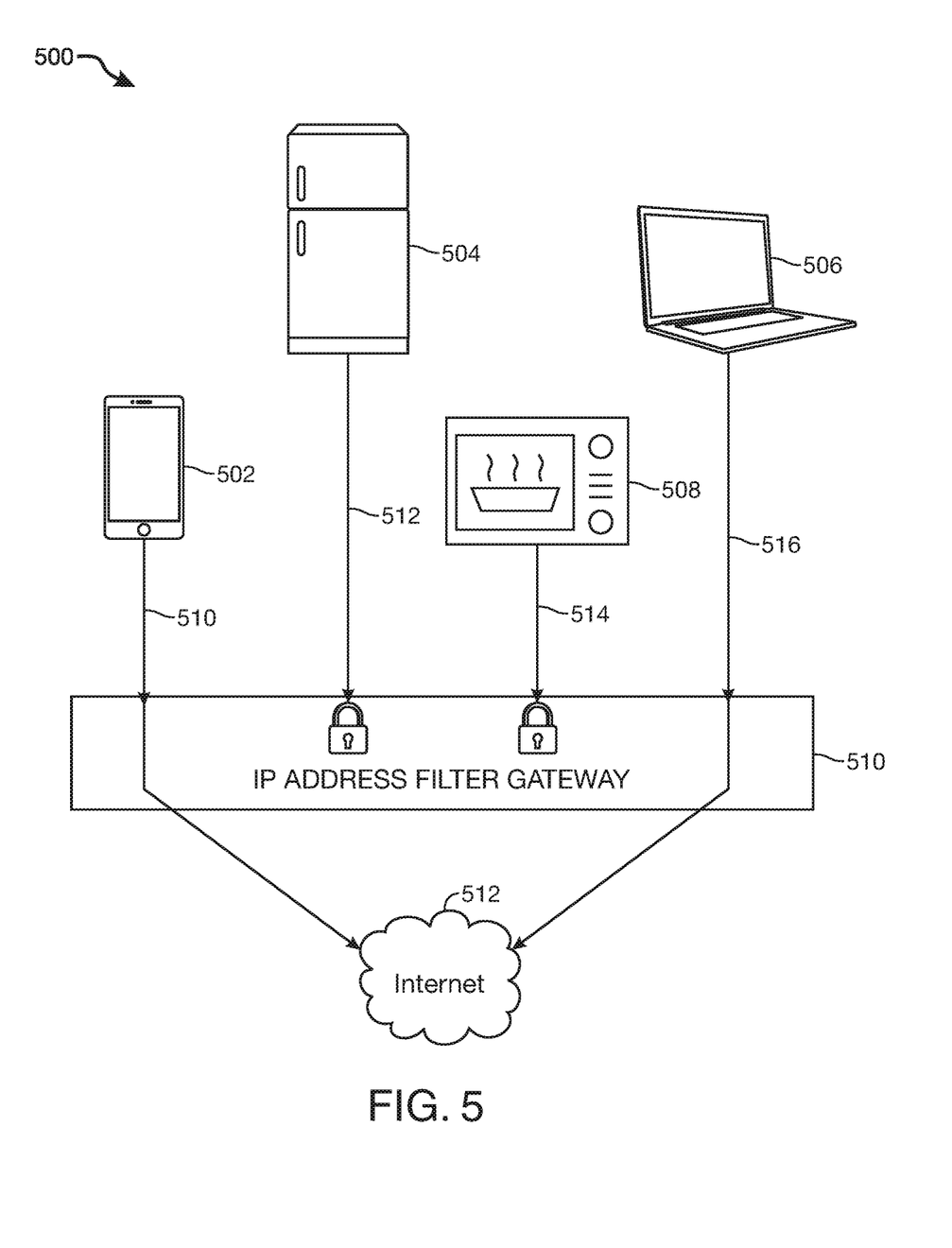
FIG. 5 shows another exemplary diagram in accordance with principles of the invention.

FIG. 5 shows an exemplary diagram of a network 500 in accordance with principles of the invention. Network 500 may include numerous IoT and non-IoT devices. The non-IoT devices in the example may include a smartphone 502 and a laptop 506. The IoT devices in the example may include a refrigerator 504 and a toaster 508.

Each of the devices 502, 504, 506 and 508 may transmit a request for access to an online application at 512. Each request may be transmitted at the same time. Each request may be transmitted at a different time. Each request may be assigned, via a respective ISP, an IP address that may indicate the type of device transmitting the request.

Smartphone 502 may transmit a request message 510. The request message 510 may include a non-IoT IP address. Refrigerator 504 may transmit a request message 512. The request message 512 may include an IoT IP address. Toaster 508 may transmit a request message 514. The request message 514 may include an IoT IP address. Laptop 506 may transmit a request message 516. The request message 516 may include a non-IoT IP address.

Online application 512 may include an IP address filter gateway 510. Application 512 may require each request message to be filtered prior to gaining access to the application. Gateway 510 may identify each request message by the type of IP address. When the IP address is a non-IOT IP address, gateway 510 may be configured to transmit the request message to the application 512 on the internet. When the IP address is an IoT IP address, gateway 510 may be configured to deny transmission of the request message to the application 512.

Request message 510, transmitted by a non-IoT device 502 may be enabled to pass through the gateway 510 and access the internet application 512. Request message 512, transmitted by IoT device 504 may not be enabled to pass through the gateway 510. Request message 514, transmitted by IoT device 508 may not be enabled to pass through the gateway 510. Request message 516, transmitted by non-IoT device 506 may be enabled to pass through the gateway 510 and access the internet application 512.

It should be appreciated, that a MAC address associated with each of the devices 502, 504, 506 and 508 may be recorded in the network as machine learning data for subsequent requests.

Thus, methods and apparatus for preventing DDoS attacks originating, at least in part, from IoT devices, are provided. Persons skilled in the art will appreciate that the present invention can be practiced by other than the described embodiments, which are presented for purposes of illustration rather than of limitation, and that the present invention is limited only by the claims that follow.

What is claimed is:

1. An internet traffic filtering system, the system classifying electronic devices, the classifying for segregating Internet of Things ("IoT") devices from non-IoT devices for a prevention of distributed denial of services ("DDoS") attacks, the internet traffic filtering system comprising:
    a first filter associated with a network router, the network router comprising an IoT output channel and a non-IoT output channel, the first filter configured to:
    receive a request message from an electronic device within the network for access to a web server;
    identify the type of the electronic device;
    when the electronic device is identified as a non-IoT type device, route the request message to the web server through the non-IoT output channel; and
    when the electronic device is identified as an IoT type device, route the request message to the web server through the IoT output channel; and
    a second filter associated with the web server, the second filter comprising an IP address filter gateway configured to:
    grant the request for access to the web server when the request message is received through the non-IoT output channel; and
    deny the request for access to the web server when the request message is received through the IoT output channel;
    and internet service provider ("ISP") configured to:
    receive the request message from the network router;
    when the request message is received from the non-IoT output channel, assign a non-IoT external IP address; and when the request message is received from the IoT output channel, assign an IoT external IP address;

wherein:
the IoT external IP address is determined at least in part by a subcategory associated with the IoT device, the subcategory identified based on a hardwired media access control address burned into a network interface card installed in the electronic device; and the second filter is configured to grant or deny a request based on the assigned external IP address.

2. The system of claim 1 wherein the identifying the type of electronic device comprises:
determining a media access control ("MAC") address associated with the device; and
classifying the type of device based on the MAC address.

3. The system of claim 2 wherein a portion of the MAC address is indicative of a manufacturer of the electronic device.

4. The system of claim 2 wherein the identifying the type of electronic device is further based on one or more unique identifiers ("UID"), the one or more UID's comprising at least one of an operating system, screen size, internal ports and external ports associated with the electronic device.

5. The system of claim 4 wherein a combination of the MAC address and the UID are stored as machine learning data.

6. The system of claim 5 wherein the machine learning data is stored in the private network and when the system receives one or more subsequent requests from one or more other electronic devices, each MAC address and the associated pre-defined identifier are added as machine learning data and the system further comprises:
repetitively using the machine learning data to improve accuracy of the classification of the type of device.

7. A private network architecture comprising:
a plurality of electronic devices comprising one or more internet of things ("IoT") devices and one or more non-IoT devices, each of the IoT devices and non-IoT devices supporting internet communication capabilities;
a first filter associated with a network router, the first filter configured to:
receive a plurality of simultaneous request messages, each request message associated with one of the plurality of electronic devices; and
identify a device type for each of the plurality of electronic devices;
filter the request message messages, the filtering comprising for each request message:
when an electronic device associated with the request message is identified as a non-IoT type device, routing the request message through the non-IoT output channel; and
when an electronic device associated with the request message is identified as an IoT type device, routing the request message through the IoT output channel; and
a second filter associated with the web server, the second filter comprising an IP address filter gateway configured:
grant device access to the web server when a request message is received through the non-IoT output channel; and
deny device access to the web server when a request message is received through the IoT output channel;

an internet service provider ("ISP") configured to:
receive the request message from the network router;
when the request message is received from the non-IoT output channel, assign a non-IoT external IP address; and
when the request message is received from the IoT output channel, assign an IoT external IP address;
wherein:
the IoT external IP address is determined at least in part by a subcategory associated with the IoT device, the subcategory identified based on a hardwired media access control address burned into a network interface card installed in the electronic device; and
the second filter is configured to grant or deny a request based on the assigned external IP address.

8. The private network architecture of claim 7 wherein the identifying via network router device filter comprises:
determining a media access control ("MAC") address associated with the electronic device; and
classifying the type of electronic device based on the MAC address.

9. The private network architecture of claim 8 wherein a portion of the MAC address is indicative of a manufacturer of the electronic device.

10. The private network architecture of claim 8 wherein the identifying the type of electronic device is further based on one or more unique identifiers ("UID"), the one or more UID's comprising at least one of an operating system, screen size, internal ports and external ports associated with the electronic device.

11. The private network architecture of claim 10 wherein a combination of the MAC address and the UID are stored as machine learning data.

12. The private network architecture of claim 11 wherein the machine learning data is stored in the private network and when the system receives one or more subsequent request messages from one or more electronic devices, each MAC address and the associated pre-defined identifier are added as machine learning data and the system further comprises:
repetitively using the machine learning data to improve accuracy of the classification of the type of device.

13. A method for filtering internet traffic, the method classifying electronic devices, the classifying for segregating IoT devices from non-IoT devices for the prevention of distributed denial of services ("DDoS") attacks, the method comprising:
using a private network:
receiving a request message from an electronic device within the private network; and
identifying the type of the electronic device;
using a first filter associated with a network router:
routing the request message through the non-IoT output channel to a second filter comprising an IP address filter gateway when the electronic device is identified as a non-IoT type device; and
routing the request message through the IoT output channel to the second filter when the electronic device is identified as an IoT type device;
using the second filter associated with a web server:
accepting a request for access to the web server when the request message is received through the non-IoT output channel; and
rejecting a request for access to the web server when the request message is received through the IoT output channel;

using an internet service provider ("ISP"):
receive the request message from the network router;
when the request message is received from the non-IoT output channel, assign a non-IoT external IP address; and
when the request message is received from the IoT output channel, assign an IoT external IP address;
wherein:
the IoT external IP address is determined at least in part by a subcategory associated with the IoT device, the subcategory identified based on a hardwired media access control address burned into a network interface card installed in the electronic device; and
the second filter is configured to grant or deny a request based on the assigned external IP address.

14. The method of claim 13 wherein the identifying the type of electronic device comprises:
determining a media access control ("MAC") address associated with the device; and
classifying the type of device based on the MAC address.

15. The method of claim 14 wherein a portion of the MAC address is indicative of a manufacturer of the electronic device.

16. The method of claim 14 wherein the identifying the type of electronic device is further based on one or more unique identifiers ("UID"), the one or more UID's comprising at least one of an operating system, screen size, internal ports and external ports associated with the electronic device.

17. The method of claim 16 wherein a combination of the MAC address and the UID is stored as machine learning data.

18. The method of claim 17 wherein the machine learning data is stored in the private network and when the private network receives one or more subsequent requests from one or more other electronic devices, each MAC address and the associated UID are added as machine learning data and the method further comprises repetitively using the machine learning data to improve accuracy of the classification of the type of device.

* * * * *